May 28, 1940.　　　D. HEYER ET AL　　　2,202,554
VARIABLE SPEED POWER UNIT
Filed July 5, 1933　　　2 Sheets-Sheet 2

INVENTORS
Don Heyer
Thomas G. Myers
BY John Flam
ATTORNEY

Patented May 28, 1940

2,202,554

UNITED STATES PATENT OFFICE 2,202,554

VARIABLE SPEED POWER UNIT

Don Heyer and Thomas G. Myers, Los Angeles, Calif., assignors to U. S. Electrical Motors, Inc., a corporation of California Application July 5, 1933, Serial No. 679,034

12 Claims. (Cl. 74—230.17)

This invention relates to a power unit adapted to drive a load at a variable speed. More particularly, the invention relates to a unit of this character wherein the speed adjustment is effected by varying the effective diameter of either a driving or a driven pulley, or both.

Such power units are in general well-known. They may comprise one or more pulley structures, having variable effective diameters. The pulley structure is usually formed of a pair of relatively axially movable sections, having opposed inclined faces, arranged to contact with opposite sides of a flexible wedge-shaped belt. In this arrangement, the radial distance from the pulley axis to the belt is a function of the axial spacing of the inclined faces. Thus for a wide separation of the faces, the belt is allowed to move inwardly toward the axis and the effective diameter of the pulley is small. On the other hand, when the faces are closer together, the belt is farther from the axis, and the effective diameter is greater.

In transmitting power at variable speeds by the aid of such pulley structures, it has been common to adjust the axial spacing of the sections of one pulley, and to provide an arrangement for compensating for the corresponding variation in the belt length in contact with the pulley, as by correspondingly but oppositely varying the effective diameter of the other pulley in driving relation to the belt; or else by varying the center distance between the pulleys, or by any other belt tightening device.

It has been proposed especially, to accomplish this result by positive adjustment of both pulley diameters in reverse senses; thus if one pulley diameter is increased, the other pulley diameter is simultaneously decreased, by positive mechanical adjustment of the pulley sections. Such schemes, however, are apt to lead to complications. For example, the belt connecting the pulleys should be kept in alinement between them; that is, the length of the belt should be kept perpendicular to the pulley axes. This can be accomplished by positively and equally adjusting both sections of each pulley structure, whereby the axial position of the belt is kept at a definite place. Otherwise, the pulley section of one structure can be axially fixed, the other section only being adjustable; and correspondingly, that section of the other pulley structure is axially fixed which engages with that side of the belt opposite the side engaged by the other fixed section. In such mechanisms, the belt is kept in alinement but its axial position is varied, as it moves outwardly of one fixed pulley section, and moves inwardly of the other fixed pulley section.

However, in all such positive adjustments of both pulley structures, extra provisions must be made to compensate for two additional factors, which will now be discussed. The first factor to be considered is the variation in the desired belt length due to the varying included angle between the upper and lower reaches of the belt as the pulley diameters vary. The other factor is belt wear, which is unavoidable and which must be taken up to ensure proper driving relation at all times.

Since all of these factors lead to complications in the adjustment mechanism, it has been proposed to obviate these complications by positively adjusting only one of the pulley structures, and by utilizing for the other structure, a resilient force, such as centrifugal force, or a spring force, for urging the two pulley sections toward each other.

With an arrangement of this character, when the positively adjusted structure has its effective diameter increased, the belt at the other pulley structure wedges the resiliently urged pulley sections apart against the resilient force. Conversely, when the positively adjusted structure has its effective diameter decreased, the resultant belt slack at the other pulley structure is taken up by the relative movement of its sections caused by the resilient force urging the sections together. It is apparent that the resilient force also takes up any belt slack automatically, independent of the cause of such slack, such as belt stretch or wear, or inherent variations due to variations in the pulley diameters.

The present arrangement relates to an electric motor drive in which one of the pulley structures has pulley sections that are urged together by a resilient force. In motor drives of this character, the force of friction between the belt sides and the pulley faces, which prevents belt slip, must be great enough to take care of momentary, or transient overloads as high as one hundred percent. For example, often the starting torque required from an electric motor is about twice the full load running torque. Accordingly, the spring or other device creating the resilient force holding the sections together must be so designed as to give ample margin for such overloads without causing a "pull out;" that is, belt slip at the driving pulley. The resultant bulky springs are obviously expensive and otherwise disadvantageous.

By the aid of the present invention, a variable speed electric motor drive is secured in which the device providing the resilient force urging the pulley structures toward each other, can be made of relatively small dimensions.

The arrangement whereby this advantage is obtained has been the result of observations and experiments upon variable speed transmissions. In such observations, the surprising fact was noted that a very great difference upon the "pull out" torque occurred when the resilient pulley adjustment was changed from the driving pulley to the driven pulley.

Thus one pulley structure having a positively fixed diameter, and another pulley structure having sections resiliently urged together, were used. In one set of observations, the positively fixed diameter pulley was made the driven pulley, and the resiliently adjustable pulley was made the driving pulley. Measurements were made of the "pull out" torques, for variations in transmission ratios. Then the same positively fixed diameter pulley was made the driving pulley, and the resiliently adjustable pulley was made the driven pulley. Similar measurements were made of the "pull out" torques for various transmission ratios. It was discovered that these latter "pull out" torques were of the order of twice the "pull out" torques when the positions of the pulleys were reversed.

This great increase in pullout torque is due to the effect of friction on the wedging or spreading action of the belt against the adjacent pulley faces. The radial force against the pulley faces, created by the belt tension, at any point, is at all times directly proportional to that tension.

The total axial force, which would act to separate the pulley faces were it not for the restraining action of the resilient force, is equal to the surface integral of the axial components of all forces acting against the pulley face. This total axial force determines the pullout; for if too great, the pulley sections separate.

When the member providing the resilient force is placed on the driving pulley, the radial force due to the belt tension is greatest at the point where the belt first enters the pulley. The axial component created by this radial force compresses the belt until all forces are in equilibrum. As the belt travels around with the pulley, the belt tension is gradually relieved. However, the axial force against the pulley face remains constant at the maximum value. The belt is unable to move radially to relieve this axial force although the radial force due to belt tension has been decreased because the force created by the belt compression is within the cone of friction and prevents any radial movement between the belt and the pulley.

The total axial force acting against the resilient member is then equal to the product of contact area and the maximum axial pressure.

When the member providing the resilient force is placed on the driven pulley, the radial force due to the belt tension is a minimum at the point where the belt enters the pulley. The axial force produced by the belt compression is then also a minimum. As the belt travels around with the pulley, the belt tension increases toward its maximum. However, the resultant axial force due to belt compression is equal to the difference of the axial components produced by the belt tension and by the frictional force between the belt and the pulley face.

It is thus clearly evident that for equal values of the restraining resilient force the useful belt tension and pullout torque will be much greater when this restraining member is placed on the driven pulley.

Accordingly it is one of the objects of this invention to provide an electric motor drive having a variable speed and in which the "pull out" characteristic is improved by appropriate design of the variable pulley structure mechanisms.

It is another object of the invention to accomplish this result in a simple and inexpensive manner, and especially by placing that adjustable pulley structure which has pulley sections resiliently urged together, upon the driven shaft.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings:

Fig. 4 is a sectional view taken along plane 4—4 of Fig. 2.

Figure 1:
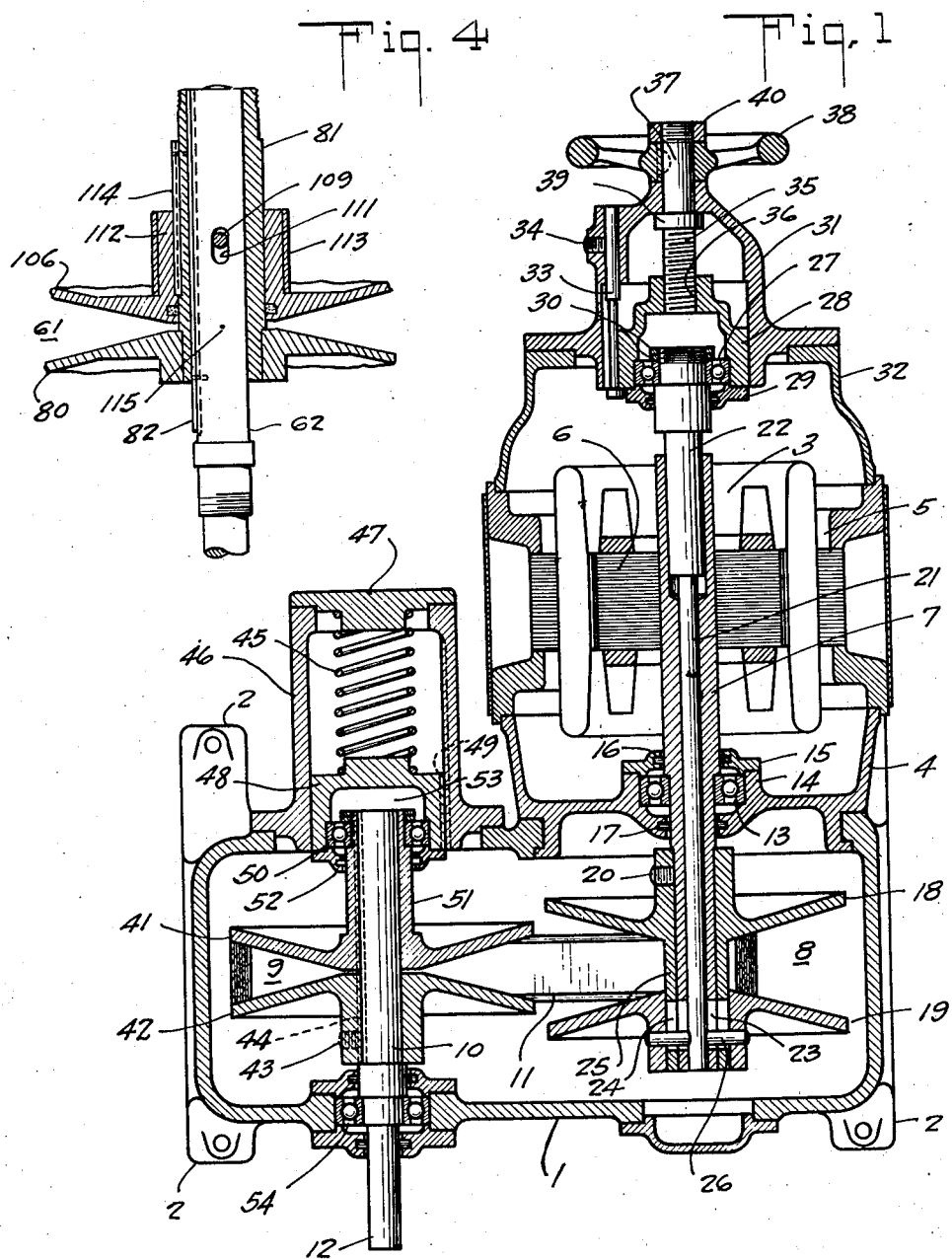
Figure 1 is a horizontal sectional view of a power unit incorporating the invention.

In Fig 1, the variable speed transmission mechanism is shown as enclosed within a casing 1. This casing is provided with a plurality of feet such as 2, whereby it may be fastened to an appropriate base or support. Projecting from and supported on one end of the casing 1 is an electric motor 3. This electric motor has a frame 4, the end of which is appropriately fastened into one wall of casing 1. This motor 3 is shown as having a stator structure 5 and a rotor structure 6. The rotor structure 6 is mounted on a shaft 7. This shaft 7 extends into the casing 1 and carries a pulley structure 8, the effective diameter of which can be varied in a manner to be hereinafter described.

The pulley structure 8 thus forms a driving pulley serving to drive a driven pulley structure 9, mounted on a driven shaft 10. The two pulley structures 8 and 9 are connected by a flexible wedge shaped belt 11. The driven shaft 10, furthermore, extends through the wall of casing 1 to provide the extension 12 adapted to be directly coupled to any appropriate load.

The motor shaft 7 is journalled adjacent one end thereof in the motor housing 4, as by the aid of an appropriate ball bearing structure 13. The outer race of this ball bearing is rigidly supported in boss 14, integral with the end frame of the motor. The inner race is rigidly driven onto a portion of the shaft 7. A cap 15 covering the boss 14 may also be provided. Felt washers 16 and 17, above and below the bearings, contact with the shaft to confine the lubricant in boss 14 against escaping.

The pulley structure 8, which is in driving relation with shaft 7, comprises a pair of relatively axially movable sections 18 and 19. These sections have opposed inclined faces engaging the opposite sides of the flexible belt 11. For the position shown, the effective diameter of pulley structure 8 is substantially at a minimum, the opposed inclined faces being separated by substantially the maximum permissible amount.

In the present instance, one of the pulley sections such as 18, is fixed against relative axial movement with respect to shaft 7, as by the aid of a set screw 20 passing through the hub of section 18 and engaging the shaft 7. The other section 19, however, is slidable in an axial direction over the hub extension 25 of section 18. Section 19 is positively adjusted by an appropriate mechanism to be hereinafter described in detail.

On the other hand, the adjustable pulley structure 9 on the driven shaft 10 is arranged to be automatically adjusted by a resilient mechanism so as to keep the belt tight at all times. In this way the objects of the invention are attained, the driving pulley structure 8 having a positive adjustment for varying the effective pulley diameter, while the driven pulley structure 9 is adjusted by a resilient mechanism automatically acting to vary the pulley diameter to take up all belt slack.

One manner in which the section 19 can be positively adjusted is disclosed in Fig. 1, although other equivalent schemes could be used.

Thus shaft 7 is shown in this instance as hollow. Extending through shaft 7 is a rod 21 having an enlarged extension 22. The rod 21 and its extension 22 slide snugly within the shaft 7 and can be axially adjusted. Near one end of the shaft 7 there is a diametric slot 23 extending through the shaft and in alignment with slots 24 formed in the hub 25. A diametric pin 26 passes through the rod 21 and engages the hub of section 19. It is apparent that axial movement of rod 21 causes a corresponding axial movement of section 19. The pin 26 serves also as a driving connection between the shaft 7 and the pulley sections 18 and 19, although this may be supplemented by appropriate keys or splines.

The mechanism for axial adjustment of rod 21 is shown at the top of Fig. 1. Thus the extension 22 of rod 21 supports the inner race of a thrust ball bearing structure 27. The outer race is accommodated in a sliding support 28. The extension 22 serving substantially as an extension of shaft 7, it is apparent that the ball bearing structure 27 serves as a journal bearing for the rotating shaft structure.

The sliding support 28 can be provided with a cap 29 and a felt washer below the bearings for confining lubricant in the support 28. Furthermore, the extension 22 can be provided with a pair of nuts 30 threaded onto the end of the extension for holding the inner race of ball bearing 27 tightly in place.

The sliding support 28 is slidable in a hollow boss 31 fastened to the end frame 32 of the motor. The sliding support 28 is restrained against angular motion, as by the aid of a guide rod 33. This guide rod passes through a slot in one side of the support 28 and is rigidly held in the boss 31 as by the aid of a set screw 34.

In order to restrict the extent of axial movement of the support 28, the guide rod 33 is provided with appropriate shoulders as by making its active length engaging in the support 28 of smaller diameter than the main body of the rod. It is apparent that axial movement of the support 28 will impart an axial movement to the rod 21. This axial movement is accomplished by the aid of a screw 35 engaging in an appropriate threaded aperture 36 in support 28. The screw 25 has a smooth extension 37 journalled in and extending through the boss 31. Mounted on this portion 37 is a hand wheel 38 whereby the screw member 35 may be rotated for moving the support 28. In order to confine the extension 37 against axial movement, a collar 39 is provided for it on the inside of member 31; and a nut 40 is threaded on its end against the hub of the wheel 38.

It is apparent that rotation of hand wheel 38 will result in an axial movement of the rod 21 and a corresponding axial movement of the section 19.

When the section 19 is made to approach the section 18, the diameter of the pulley structure 8 is increased, the belt 11 moving radially outwardly. This belt thus wedges between the sections 41 and 42 of the pulley structure 9, causing them to spread apart. In this case, the section 42 is fixed to the driven shaft 10 and section 41 is axially movable thereon. In this way as the relative diameters are made to vary, the belt 11 moves along the faces of the axially fixed sections 42 and 18, the belt thus being kept in alinement between the two pulley structures, although its position longitudinally of the shaft axes varies.

The fixed section 42 is keyed to the shaft 10, as by key 44. A set screw 43 may in addition be provided, passing through the hub of the fixed section 42 and engaging the key 44.

The adjustable section 41 is splined to shaft 10 by the aid of the key 44. It is urged resiliently toward the section 42 by the aid of a compression spring 45. This compression spring is located in a cylindrical housing 46 joined to the casing 1. This housing has a cover member 47 forming a guide for one end of the spring 45. The other end of the spring 45 abuts against a support 48, slidable inside of the housing 46. This support 48 is restrained against angular motion as by the aid of a spline 49.

The sliding support 48 carries a thrust ball bearing structure 50. The outer race of the ball bearing structure is rigidly mounted inside of the sliding support 48. The inner race is mounted on a shoulder of the hub 51 of the slidable section 41. It is thus seen that the ball bearing structure 50 serves as a journal support for the driven structure, including shaft 10 and the pulley structure 9. Furthermore, the supporting member 48 can be provided with a cover member or cap 52 having a felt washer to confine the lubricant in the hollow space 53 in which the ball bearing structure is accommodated.

The other end of the shaft 10 is supported in a similar ball bearing structure 54, located in the wall of the casing 1.

In the position shown, the effective diameter of pulley structure 9 is at maximum, the compression spring 45 being expanded and serving to hold the two sections 41 and 42 in frictional driving relation with the opposite sides of the belt 11. When the section 19 of pulley structure 8 is positively adjusted to increase the diameter of that structure, the belt 11 moves inwardly with respect to the axis of shaft 10, and wedges the slidable section 41 outwardly. This causes the spring 45 to be compressed. On the other hand, when the effective diameter of pulley structure 8 is reduced, the spring 45 is permitted to expand, urging the sections 41 and 42 toward each other. For a given torque transmission, the spring 45 can be made much lighter than if the pulley structures 8 and 9 were reversed. By actual trial, the transmission of torque can be increased 100 per cent without "pull out" by placing the resilient mechanism on the driven pulley structure instead of on the driving pulley structure.

Figure 2:
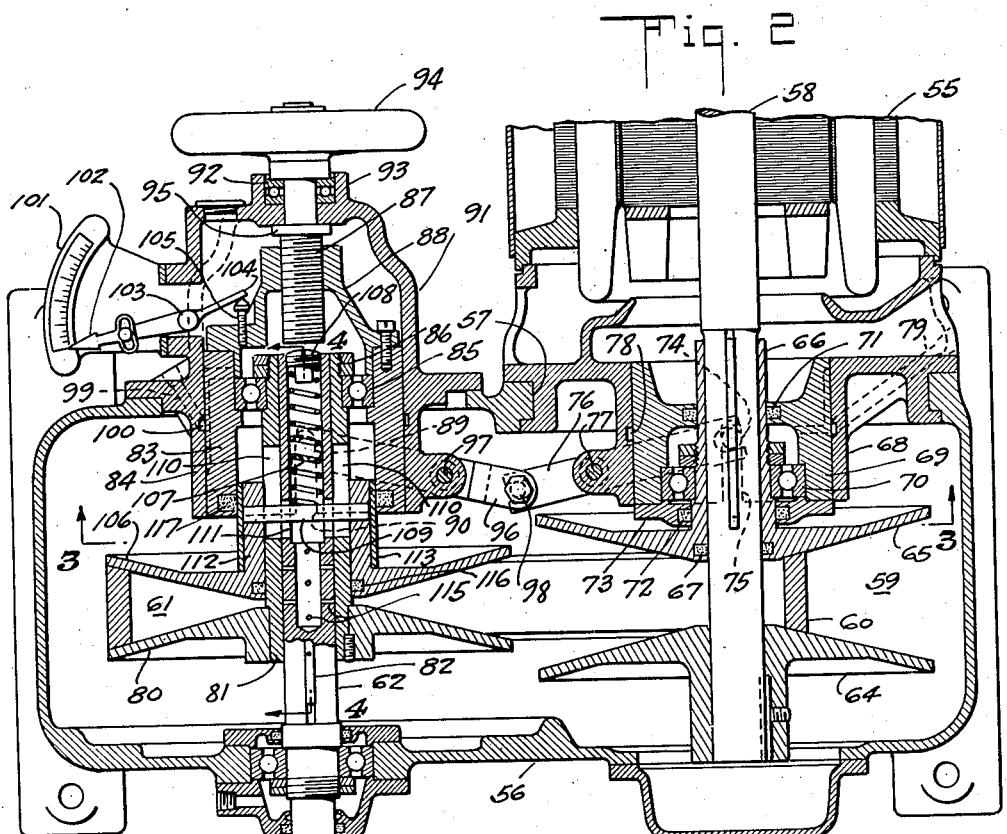
Fig. 2 is a horizontal sectional view of a modified form of the invention.
Figure 3:
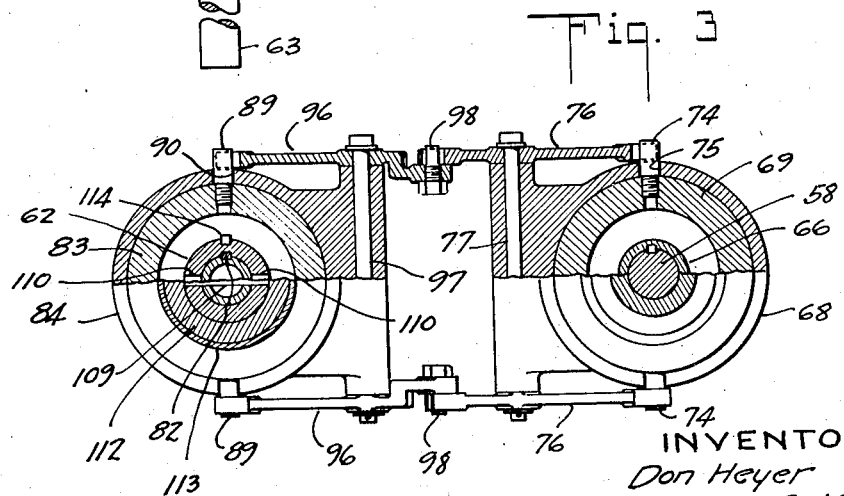
Fig. 3 is a detail view, partly in section, taken along plane 3—3 of Fig. 2.

Another form of the invention is illustrated in Figs. 2, 3 and 4. In this form, the electric motor 55 is shown as appropriately supported on the outside of one wall of the housing 56, as by the dovetail or bayonet construction 57. The motor shaft 58 extends into the housing 56 and carries a positively adjusted variable pulley structure 59. This pulley structure is connected by the flexible belt 60 with another adjustable pulley structure 61, mounted on the driven shaft 62. This driven shaft 62 has an extension 63 outside of the housing 56 for connection to an appropriate load.

In the present instance section 64 of the driving pulley structure 59 is axially fixed on the shaft 58; and the corresponding pulley section 65 is axially and positively adjustable. This section 65 can be appropriately splined to shaft 58 (as seen in Fig. 3), and has a hub 66 which extends a considerable distance along the shaft 58. A lubricating felt washer 67 can be accommodated in a recess on the inner face of the hub 66.

To provide a guide for axial movement of section 65, use is made of a stationary boss 68 shown in this instance as cast integrally with the motor casing, and having a cylindrical aperture for the accommodation of a longitudinally sliding support 69. The hub 66 passes through the support 69 and is journalled therein as by the aid of the ball thrust bearings 70. The outer race of this ball bearing structure is fixed inside of the member 69; and the inner race is fixed on the hub 66. Appropriate felt lubricant retaining washers 71 and 72 are provided respectively in the member 69 and in the cover 73 for this member.

In order to move the member 69 axially as well as to restrain it against rotation, use is made of a pair of pins 74 fastened into opposite sides of the member 69 and projecting through appropriate slots 75 in the boss 68. It is apparent that the pins 74 guide the motion of member 69 in an axial direction. Motion of member 69 is accomplished by the aid of a pair of levers 76 pivoted on a stationary axis as by the aid of a pin 77. That end of the lever which accommodates pin 74 is slotted. The manner in which the levers 76 are operated will be hereinafter described.

For lubricating purposes, an aperture 79 can extend from the lubrication grooves 78 on the inside of boss 68 to the exterior of the casing 56. This groove 78 is in communication with appropriate oiling grooves in the cylindrical surface of member 69, as well as with the space around the bearings 70.

It is apparent that as viewed in Fig. 2, a clockwise movement of lever 76 will cause section 65 to move toward section 64, thereby increasing the effective diameter of pulley structure 59. At the same time the effective diameter of pulley structure 61 is correspondingly varied in an opposite sense.

This variation in the effective diameter of pulley structure 61 is accomplished by adjustment of the section 80. As section 65 moves downwardly, as viewed in Fig. 2, section 80 moves downwardly also, in order to keep the belt 60 in alinement between the two pulley structures.

Thus upon shaft 62 is slidable a sleeve 81 rigidly fastened to the inside of section 80. Sleeve 81 is restrained against relative angular motion with respect to shaft 62 as by the aid of spline 82. The axial adjustment of sleeve 81 is accomplished by the aid of a member 83 similar to member 69. This member 83 is slidable in a boss 84. This boss 84 is integral with a supplemental casing member 91 fastened to a wall of the casing 56. The sleeve 81 is appropriately journalled in member 83 as by the aid of ball bearing structure 85. The outer race of this ball bearing structure is rigidly fastened inside of the member 83. The inner race is rigidly fastened against a shoulder on the sliding sleeve 81, as by the aid of the nuts 86.

Axial motion of member 83 thus serves to move the section 80 in an axial direction. This axial motion is accomplished in this instance by the aid of a screw mechanism including a threaded stud 87. This threaded stud engages a threaded aperture in a cap 88 fastened to member 83. Angular motion of member 83 is prevented by diametrically opposite pins 89 fastened to member 83 and extending through slots 90 in the boss 84. Stud 87 is rotatably supported in the member 91 as by the aid of the step roller bearings 92 accommodated in a boss 93. A hand wheel 94 can be fastened to the end of the member 87 for rotating it. Axial movement of member 87 is prevented as by the aid of a collar 95, engaging the inner wall of the supplemental housing member 91.

Axial movement of member 83 produced by rotation of hand wheel 94 causes a corresponding axial movement of member 69. This is done by the aid of a pair of levers 96 pivoted on a stationary axis as by the aid of a pin 97. One end of each of the levers is bifurcated to accommodate the corresponding pin 89; and the other end carries a pin such as 98 accommodated in a bifurcated end of the corresponding lever 76. It is apparent that a downward motion of member 83 causes a counterclockwise rotation of levers 96; and this in turn causes a clockwise rotation of levers 76, and a downward motion of member 69. In this way, therefore, the positive adjustment of sections 65 and 80 in the same direction is secured.

The provisions for lubrication of the sliding motion of member 83, and of the bearings 85 can be provided as by the aid of an aperture 99 in supplemental housing member 91. This aperture leads to the lubricant groove 100 on the inside of the boss 84, and this groove is in appropriate communication with oiling grooves on member 83. Supplemental passageways can lead from these grooves to the space above the bearings 85.

There is also shown a speed indicator mechanism including the arcuate stationary scale 101 cooperating with a pointer 102. This pointer is pivoted at 103 and has an extension 104 in the path of movement of an actuating pin 105 fastened to the cap 88.

In order to take up any belt slack due to belt wear or any other reason, the section 106 of pulley structure 61 is resiliently urged at all times towards the positively adjustable section 80. This resilient means, as in the first form disclosed, operates upon the driven pulley structure.

The resilient force can be provided as by the aid of a compression spring 107. This compression spring has its upper end abutting against the head of a screw 108 threaded into an aperture formed in shaft 62, making this shaft hollow for at least a portion of its length. The lower end of this compression spring 107 is in contact with a diametrical pin 109 which passes through appropriate slots 110 in the sleeve 81 and through slots 111 in shaft 62. The pin 109 furthermore extends through the hub 112 of the pulley section 106. A protecting sleeve 113 can be pressed over the hub 112 to cover the ends of the pin 109. It is apparent that spring 107 acting on pin 109, urges section 106 downwardly, the pin 109 effectively serving to prevent relative axial movement between sections 80 and 106. However, in order to provide additional means for preventing relative angular motion of these two sections, use may be made of a spline 114 between hub 112 and sleeve 81.

Lubrication for sleeve 81 can be accomplished as by the aid of a series of apertures 115 extending through the hollow portion of shaft 62 and outwardly toward the sleeve 81. A lubricating washer 116 can be accommodated in a groove on the inner surface of hub 112, and acting on the sleeve 81. Similarly a lubricant retaining washer 117 can be accommodated on the inner face of the axially movable member 83 and contacting with the outer periphery of the protecting sleeve 113.

We claim:

1. In a variable speed power unit, a driving pulley structure, a driven pulley structure, a flexible belt connecting the pulley structures, each pulley structure having a pair of relatively axially movable sections with opposed inclined faces, means for positively adjusting the relative axial positions of the driving pulley sections, means for adjusting one of the pulley sections of the driven pulley structure, and means for resiliently urging the other section of the driven pulley structure toward said one pulley section, whereby the belt tension is maintained substantially constant.

2. In a variable speed power unit, a driving pulley structure, a driven pulley structure, a flexible belt connecting the pulley structures, each pulley structure having a pair of relatively axially movable sections with opposed inclined faces, mechanism for simultaneously adjusting a pulley section of the driving pulley structure and one of the pulley sections of the driven pulley structure, said adjustable pulley sections engaging opposite sides of the belt, and means for resiliently urging the other section of the driven pulley structure toward said one pulley section, said mechanism comprising a pair of pivoted levers, each pivoted on a stationary axis, one end of each lever being directly pivotally connected to the other lever, and the other end of each lever being respectively connected to the corresponding adjustable section.

3. In a variable speed power unit, a driving pulley structure, a driven pulley structure, a flexible belt connecting the pulley structures, each pulley structure having a pair of relatively axially movable sections with opposed inclined faces, mechanism for simultaneously adjusting a pulley section of the driving pulley structure and one of the pulley sections of the driven pulley structure, said adjustable pulley sections engaging opposite sides of the belt, and means for resiliently urging the other section of the driven pulley structure toward said one pulley section, said mechanism comprising a pair of pivoted levers, each pivoted on a stationary axis, one end of each lever being directly pivotally connected to the other lever, and the other end of each lever being respectively connected to the corresponding adjustable section, and means for positively moving one of said levers.

4. In a variable diameter pulley structure, a pair of relatively axially movable sections with opposed inclined faces, a shaft for said sections, means for positively adjusting one of the sections, and means to maintain the belt length requirement substantially constant, including resilient means for resiliently urging the other section toward said one section.

5. In a variable diameter pulley structure, a pair only of relatively axially movable sections with opposed inclined faces, a shaft for said sections, said shaft having a hollow portion, one of the sections being slidable on the shaft, means for positively moving said section on the shaft, a spring in the hollow portion, and means whereby said spring urges the other section toward said one section.

6. In an enclosed electrically driven variable speed power unit, a driving shaft and a driven shaft, an electric motor including a stator and a rotor, said rotor being in axial driving relation to said driving shaft, a driving pulley structure in axial driving relation to said driving shaft, a driven pulley structure in axial driving relation to said driven shaft, a belt in active driving relation to said pulley structures, each of said pulley structures including a pair of pulley sections having opposed inclined belt engaging faces, forming by relative axial adjustment variable effective pulley diameters, means for holding one pulley section of said driving pulley structure in fixed axial position with respect to said driving shaft, means for positively adjusting the axial position of the other pulley section of said driving pulley structure in either direction, means for positively determining the axial position of one pulley section of said driven pulley structure, means for resiliently urging the other pulley section of said driven pulley structure into active driving relation with said driving belt, a casing having walls enclosing said pulley structure, and means for supporting said motor on one wall of said casing, said motor supporting means including a supporting member secured to said stator, said supporting member and said casing having interengaging supporting surfaces formed thereon, said supporting surfaces forming substantially entirely the sole means for supporting said motor in fixed axial position.

7. In a variable speed power unit, a driving pulley structure, a driven pulley structure, a flexible belt connecting the pulley structures, each pulley structure having a pair of relatively axially movable sections with opposed inclined faces, and a mechanism for simultaneously adjusting a pulley section of the driving pulley structure and a pulley section of the driven pulley structure, said adjustable pulley sections engaging opposite sides of the belt, said driven pulley structure including means for maintaining the belt required length substantially constant, said mechanism comprising a pair of pivoted levers, each pivoted on a stationary axis, one end of each lever being pivotally connected to the other lever, and the other end of each lever being respectively connected to the corresponding adjustable section.

8. In a variable speed power unit, a driving pulley structure, a driven pulley structure, a flexible belt connecting the pulley structures, each pulley structure having a pair of relatively axially movable sections with opposed inclined faces, and a mechanism for simultaneously adjusting a pulley section of the driving pulley structure and a pulley section of the driven pulley structure, said adjustable pulley sections engaging opposite sides of the belt, said driven pulley including means for maintaining the belt tension substantially constant, said mechanism comprising a pair of pivoted levers, each pivoted on a stationary axis, one end of each lever being pivotally connected to the other lever, and the other end of each lever being respectively connected to the corresponding adjustable section, and means for positively moving one of said levers.

9. In a variable speed power unit, a driving pulley structure, a driven pulley structure and a flexible belt connecting the pulley structures, each pulley structure having a pair of sections with opposed inclined faces, one section of said driving pulley being fixed against axial movement, the other section of said driving pulley being axially movable, both sections of said driven pulley being axially movable, means for adjusting the movable section of the driving pulley and the section of the driven pulley engaging the opposite side of the belt in the same direction, and resilient means urging the other section of said driving pulley toward the one adjusted, whereby the belt tension is maintained substantially constant.

10. In a variable speed power unit, a driving pulley structure, a driven pulley structure and a flexible belt connecting the pulley structures, each pulley structure having a pair of sections with opposed inclined faces, one section of said driving pulley being fixed against axial movement, the other section of said driving pulley being axially movable, both sections of said driven pulley being axially movable, means for adjusting the movable section of the driving pulley and the section of the driven pulley engaging the opposite side of the belt in the same direction, said means comprising a pair of pivoted levers, each pivoted on a stationary axis, one end of each lever being pivotally connected to the other lever, and the other end of each lever being respectively connected to the corresponding adjustable section, and resilient means urging the other section of said driving pulley toward the one adjusted, whereby the belt tension is maintained substantially constant.

11. In a variable diameter pulley structure, a pair of relatively axially movable sections with opposed inclined faces, a shaft for said sections, said shaft having a hollow portion, one of the sections being slidable on the shaft and having a long hub, the other section being slidable on the hub, and resilient means in the hollow shaft for urging the other section toward the said one section.

12. In an enclosed electrically driven variable speed power unit, a driving shaft and a driven shaft, an adjustable pulley structure in axial driving relation to each of said shafts, each of said pulley structures including a pair of pulley sections having opposed inclined belt engaging faces forming by relative axial adjustment variable effective pulley diameters, a belt in active driving relation to said pulley structures, a casing enclosing said belt and pulley structures, a load driving means projecting outside of said casing, bearing means cooperating with said casing for rotatably supporting said shafts, said driven pulley structure having a fixed section and an adjustable section, said adjustable section having a long hub and being slidable on the driven shaft, a housing secured to the casing, an adjusting cup slidably supported within said housing, a radial and thrust bearing supporting said hub in said cup and forming a support for the shaft and resilient means in said housing for moving said cup.

DON HEYER.
THOMAS G. MYERS.